Patented Aug. 16, 1938

2,127,098

UNITED STATES PATENT OFFICE 2,127,098

PROCESS FOR THE PREPARATION OF 2,6-DICHLOROANTHRAQUINONE

Myron S. Whelen, Milwaukee, Wis., assignor to E. I. du Pont de Nemours & Company, Wilmington, Del., a corporation of Delaware No Drawing. Application June 24, 1936, Serial No. 87,119

1 Claim. (Cl. 260—384)

This invention relates to a new and improved process for the preparation of 2,6-dichloroanthraquinone. The object of this invention is to provide a process whereby 2,6-anthraquinonedisulfonic acids may be converted to 2,6-dichloroanthraquinone of high purity, and in excellent yields.

The preparation of 2,6-dichloroanthraquinone from 2,6-anthraquinonedisulfonic acid has heretofore been carried out by the direct chlorination of alkali metal salts. It is known, however, that on halogenating the 2,6-anthraquinonedisulfonic acid alkali metal salts that after the first sulfonic acid group has been replaced by chlorine the resulting product, namely the 2-chloro-6-anthraquinonesulfonic acid alkali metal salt, is very insoluble and precipitates out, making it practically impossible to substitute the second sulfonic acid group completely with chlorine. See Fierz-David, Helvetica Chimica Acta, vol. 10, pp. 225–227. Due to the insolubility of the sodium salts of 2-chloro-6-anthraquinonesulfonic acid, the chlorination must be carried out in extremely large volumes of water, making this process impractical for commercial use.

I have found that the free 2,6-anthraquinonedisulfonic acid can be easily halogenated to give high yields of a substantially pure 2,6-dichloroanthraquinone.

The 2,6-anthraquinonedisulfonic acid may be obtained by diluting the sulfonation mass in which it is formed to from 87 to 100% sulfuric acid concentration, thereby precipitating this isomer in the form of its oxonium salt, as more particularly described in copending application, U. S. Serial No. 87,118 (U. S. Patent 2,074,307). The 2,6-anthraquinonedisulfonic acid obtained, or its oxonium salt, may be used as a starting material in the present process.

The following example is given to more fully illustrate the invention. The parts used are by weight.

Example

An amount of the oxonium salt of anthraquinone-2,6-disulfonic acid together with adhering sulfuric acid (as isolated in U. S. Patent 2,074,307, Example 1) equivalent to 100 parts of anthraquinone-2,6-disulfonic acid is dissolved in about 4 liters of water, and about 125 parts of concentrated hydrochloric acid and about 100 parts of concentrated sulfuric acid are added thereto. The mass is then heated to the boiling point and while refluxing a solution of about 100 parts of sodium chlorate dissolved in 1,000 parts of water are added. Refluxing is then continued until no further chlorination takes place. The 2,6-dichloroanthraquinone is filtered off, washed free of acid with hot water and dried.

It is, of course, understood that the 2,6-anthraquinonedisulfonic acid obtained by slurrying the oxonium salt of the 2,6-anthraquinonedisulfonic acid in acetic acid, hydrochloric acid, etc., may be used in place of the oxonium salt for this reaction, although as illustrated in the example the oxonium salt may be used directly as it is obtained in the sulfonation mass. Where the filter cake of the oxonium salt contains a large amount of sulfuric acid the 100 parts of concentrated acid used in the example may be reduced or omitted.

I claim:

In the process for preparing 2,6-dichloroanthraquinone by replacement of both sulfonic acid groups of a 2,6-anthraquinonedisulfonic acid compound, the step which comprises employing as the starting material 2,6-anthraquinonedisulfonic acid.

MYRON S. WHELEN.